(12) United States Patent
Yasuda

(10) Patent No.: US 8,109,521 B2
(45) Date of Patent: Feb. 7, 2012

(54) METAL LAMINATE CYLINDER HEAD GASKET

(75) Inventor: Kisho Yasuda, Tokyo (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 538 days.

(21) Appl. No.: 12/318,169

(22) Filed: Dec. 23, 2008

(65) Prior Publication Data

US 2009/0166986 A1    Jul. 2, 2009

(30) Foreign Application Priority Data

Dec. 26, 2007    (JP) ................................. 2007-334024

(51) Int. Cl.
*F02F 11/00*    (2006.01)
(52) U.S. Cl. ....................................... 277/598
(58) Field of Classification Search .................. 277/590, 277/593, 598
See application file for complete search history.

(56) References Cited

U.S. PATENT DOCUMENTS

| 4,203,608 | A  | * | 5/1980 | Nicholson | 277/595 |
| 4,688,809 | A  | * | 8/1987 | Deppe | 277/594 |
| 6,283,480 | B1 | * | 9/2001 | Miura et al. | 277/593 |
| 6,786,490 | B2 | * | 9/2004 | Fujino et al. | 277/590 |

* cited by examiner

*Primary Examiner* — Vishal Patel
(74) *Attorney, Agent, or Firm* — Manabu Kanesaka

(57) ABSTRACT

A metal laminate cylinder head gasket is formed by a plurality of metal plates laminated together, and a misalignment preventing portion for preventing misalignment of the laminated metal plates, formed in the metal plates. The misalignment preventing portion includes a pair of notches facing each other and penetrating each of the metal plates, and a bridging portion provided between the notches in each of the metal plates and bulging in one direction to project from a surface of each of the metal plates. The metal plates are laminated together such that the notches and the bridging portions overlap and closely contact to engage together to thereby prevent displacement of the metal plates.

7 Claims, 2 Drawing Sheets

METAL LAMINATE CYLINDER HEAD GASKET

BACKGROUND OF THE INVENTION AND RELATED ART STATEMENT

The present invention relates to a metal laminate cylinder head gasket formed by laminating multiple metal plates.

For a cylinder head gasket placed between a cylinder block and a cylinder head of an internal combustion engine, a well-known cylinder head gasket formed by laminating multiple metal plates includes means which fastens the laminated multiple metal plates so as to prevent the metal plates from moving with each other. Conventionally, there are various types of fastening means for the above-mentioned means, for example, means which connects the metal plates by folding back a tongue piece provided in the metal plate on one side to the other metal plate, to a portion which is not sandwiched between the cylinder block and the cylinder head in the laminated multiple metal plates; or means which connects the metal plates by fastening the laminated metal plates by folding back the tongue piece while controlling the increase of the thickness of the metal plates in a gasket face, or by spot welding at an arbitrary position. Also, in the gasket disclosed in Japanese Patent Publication No. 2004-239313, the multiple metal plates are fastened by a rivet at a cooling water jacket.

However, as the internal combustion engines have recently become small in size and light in weight, there arises a chance of relative deformation of the cylinder block and the cylinder head due to oscillation during operation of the internal combustion engines, or pressure variation inside a combustion chamber; or deformation due to heating, cooling and the like of the gasket. Accordingly, when the cylinder block and the cylinder head are relatively displaced even a little due to the above-mentioned deformations, a force is applied to move the multiple metal plates constituting the gasket out of alignment from each other. In this case, if a connecting force between the laminated metal plates by the spot welding, the rivet and the like is weak, the connection between the metal plates is released in the above-mentioned portion. Accordingly, the connecting force is required to improve in some measure, so that the cost increases as well. Also, even in the case that the multiple metal plates are connected by folding back the tongue piece, misalignment between the metal plates and the like might occur if the connecting force between the respective metal plates is not improved by improving the strength of the tongue piece, or increasing the number of tongue pieces, so that the cost increases as well.

A technical feature of this invention is to form a misalignment preventing portion between the respective metal plates with simple means by using a projection from the surface of the laminated metal plates in a position corresponding to the cooling water jacket of the metal laminate cylinder head gasket which is structured by laminating the multiple metal plates.

Moreover, a specific technical feature of the invention is to form a simple misalignment preventing portion which eliminates the misalignment by fastening each metal plate as follows. The cylinder block is more easily deformed in a direction perpendicular to an arranging or longitudinal direction of multiple cylinder bores, so that the laminated multiple metal plates are strongly retained so as not to have the misalignment in a direction perpendicular to the arranging or longitudinal direction of the cylinder bores wherein the cylinder block is easily deformed. Also, the laminated multiple metal plates include a configuration wherein a restoring force acts on the joint surfaces of the metal plates in the arranging or longitudinal direction of the cylinder bores.

Further objects and advantages of the invention will be apparent from the following description of the invention.

SUMMARY OF THE INVENTION

In order to solve the above-mentioned problem, a metal laminate cylinder head gasket according to the present invention is formed by laminating multiple metal plates, and includes a misalignment preventing portion which controls misalignment between the joint surfaces of the respective laminated metal plates, in multiple positions corresponding to a cooling water jacket of a cylinder block for the laminated metal plates. The misalignment preventing portion is provided with a pair of notches facing each other, and a bridging portion between the notches bulges in a mountain shape in a direction from the surface of each metal plate, so that the metal plates are overlapped to closely contact each other in the bridging portion.

In a preferred embodiment of the metal laminate cylinder head gasket according to the invention, the pair of notches is respectively formed on both sides of an arranging or longitudinal direction of multiple combustion chamber bores in such a way that at least central parts of the notches orient in a direction parallel to the arranging or longitudinal direction of the combustion chamber bores. The respective marginal portions of the notches of the laminated metal plates contact each other, so that the misalignment in the direction perpendicular to the arranging or longitudinal direction of the combustion chamber bores of each metal plate is retained. It is effective that the pair of notches is bent in a direction such that both end portions of the notches slope to the arranging direction of the multiple combustion chamber bores in order to control the development of cracking from ends of the notches. In such a case, the pair of notches can be formed in a circular arc shape wherein the respective opposed sides of the notches have a depression.

In the metal laminate cylinder head gasket with the above-mentioned structure, the respective metal plates are not retained by a fastened portion, so that even if the cylinder block and the cylinder head are relatively displaced and a force which moves the laminated multiple metal plates from each other is activated, not only the fastened portion will not be damaged, but the misalignment preventing portion can be easily formed. Also, in the case of the direction perpendicular to the arranging or longitudinal direction of multiple cylinder bores wherein the cylinder block can be easily deformed, the pair of notches is provided in the direction parallel to the arranging direction of the cylinder bores on the respective laminated metal plates, and the bridging portion between the notches bulges in the mountain shape in the same direction. Accordingly, the metal plates are strongly retained so as not to cause the misalignment between the respective metal plates.

Also, in regard to the arranging direction of the cylinder bores, the bridging portion bulges in the mountain shape, so that a restoring force along the slope face of the bridging portion acts on the joint surfaces of the metal plates when the joint surfaces are restored. As a result, even if the metal plates are slightly moved out of alignment, the metal plates naturally return to the original configuration.

Due to the structure of the misalignment preventing portion, the misalignment of the metal plates is prevented, so that the misalignment preventing portion can be formed in a press work of the metal plates, and a process for fastening the respective metal plates can be eliminated to reduce the costs for connecting the metal plates.

According to the metal laminate cylinder head gasket of the invention, a projection from the surface of the laminated metal plates can be presented in the position corresponding to the cooling water jacket of the metal laminate cylinder head gasket structured by laminating the multiple metal plates. As a result, the misalignment preventing portion of the respective metal plates can be formed by simple means.

DETAILED DESCRIPTION OF PREFERRED EMBODIMENTS

Figure 1:
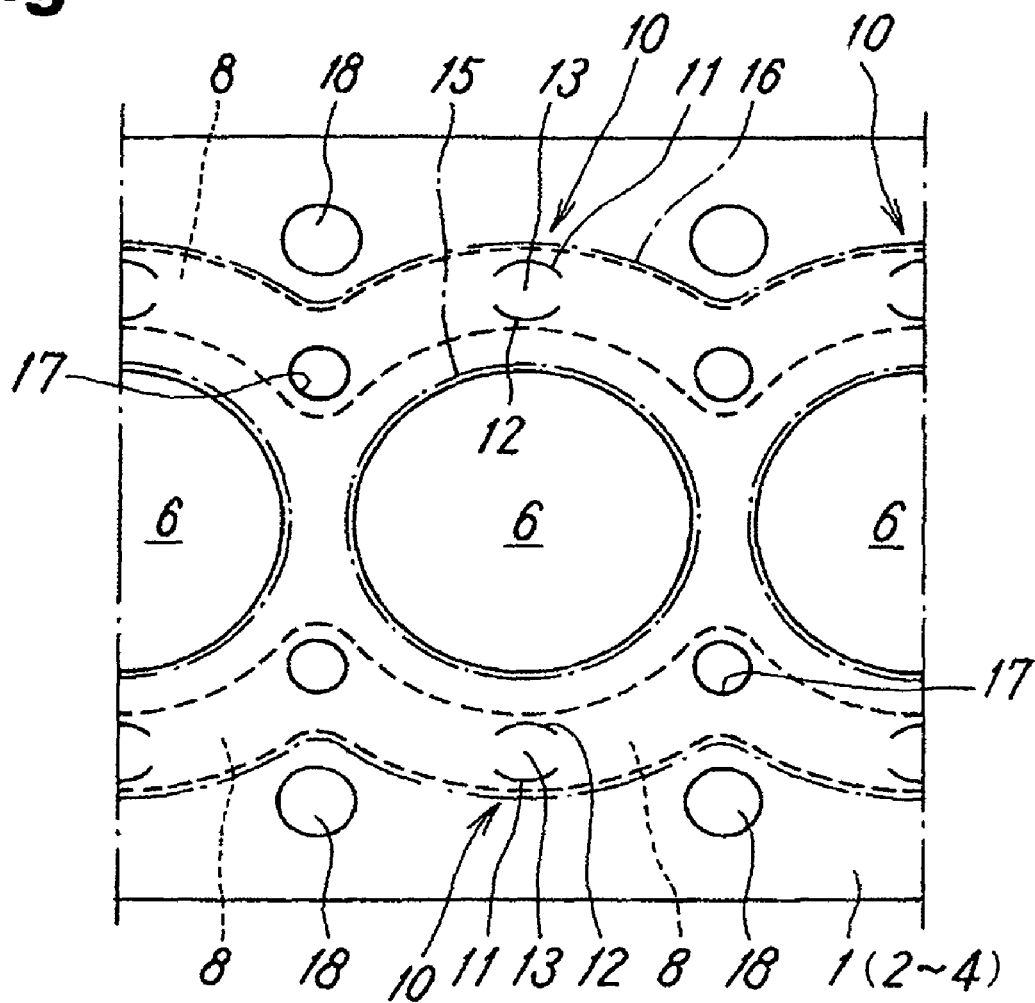
FIG. 1 is a plan view of a substantial portion of an embodiment of a metal laminate cylinder head gasket according to the present invention.
Figure 2:
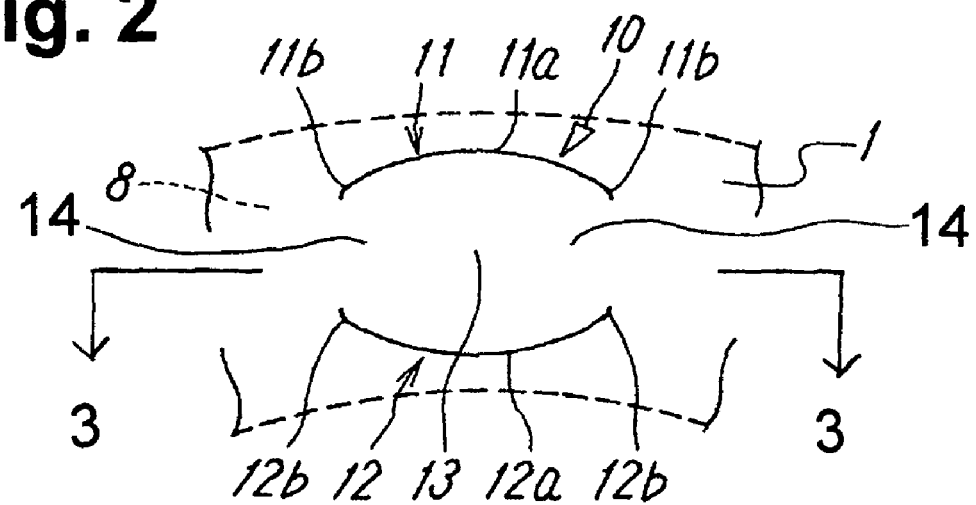
FIG. 2 is an enlarged view of the substantial portion of the embodiment.
Figure 3:
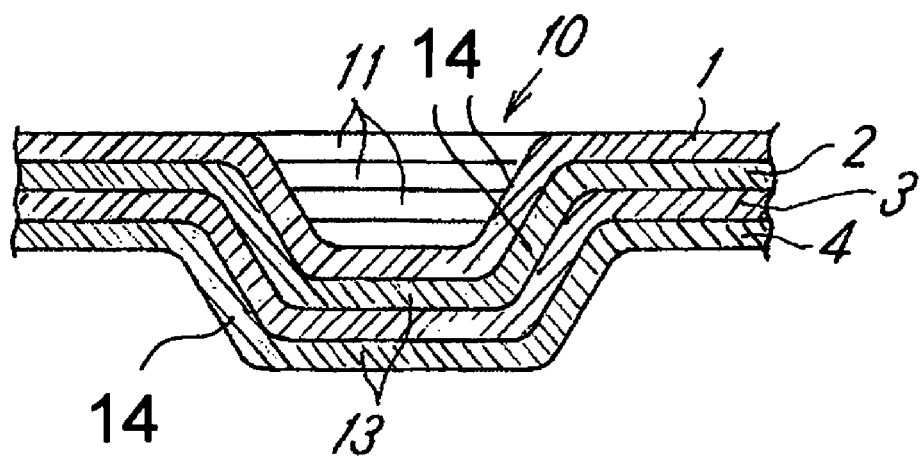
FIG. 3 is an enlarged cross sectional view taken along line 3-3 of FIG. 2.

FIGS. 1 to 3 show an embodiment of a metal laminate cylinder head gasket according to the invention. The metal laminate cylinder head gasket is structured by laminating multiple metal plates 1 to 4, and multiple combustion chamber bores 6 corresponding to multiple cylinder bores of an internal combustion engine are arranged linearly. The metal laminate cylinder head gasket is formed long in the arranging direction of the combustion chamber bores 6.

Also, this gasket includes misalignment preventing portions 10, which control misalignment of joint surfaces of the respective laminated metal plates 1 to 4, in several positions corresponding to cooling water jacket 8 of a cylinder block of the laminated metal plates 1 to 4, i.e., on the cooling water jacket 8.

The misalignment preventing portions 10 are provided with pairs of notches or cut portions 11, 12 which face each other, in a position corresponding to the laminated metal plates 1 to 4, and bridging portions 13 formed between the notches 11, 12 bulge in a mountain shape (downward mountain shape in the drawings) in the same direction from the surfaces of the respective metal plates. Each metal plate 1 to 4 is overlapped in a state wherein the bridging portions 13 closely contact with each other.

Incidentally, in the example shown in the drawings, the thicknesses of the metal plates 1 to 4 are enlarged and shown schematically, so that the shapes of the notches 11, 12 and the mountain-shaped bridging portions 13 formed in each metal plate 1 to 4 have slightly different shapes. Namely, as the metal plates are located upward, the lengths of the notches 11, 12 and the bridging portions 13 become shorter. However, when a thinner metal plate is used in a real production of a gasket, the shapes of the notches 11, 12 and the bridging portions 13 can be the same.

The structure of the misalignment preventing portions 10 is described more specifically as follows. In the pairs of notches 11, 12, at least central portions 11a, 12a are respectively formed on both sides in an arranging direction of multiple combustion chamber bores 6, more specifically, on both sides relative to the center of the combustion chamber bores 6, toward a direction approximately parallel to the arranging direction of the combustion chamber bores 6. The bridging portions 13 between the notches 11, 12 bulge in the mountain shape as described above. Generally, the cylinder block is easily deformed in a direction perpendicular to the arranging direction of the multiple cylinder bores compared to the arranging direction of the cylinder bores. However, as described above, each laminated metal plate 1 to 4 is provided with the pairs of notches 11, 12 in the direction parallel to the arranging direction of the cylinder bores, and the bridging portions 13 between the notches 11, 12 bulge in the mountain shape in the same direction. As a result, marginal portions of the notches 11, 12 of the respective metal plates contact each other, so that the metal plates can be strongly retained to each other so as not to cause misalignment.

Especially, as shown in FIG. 3, if the bulging height of the bridging portions 13 is approximately the same or above a total thickness of the laminated metal plates 1 to 4, the marginal portions (cutting surfaces) of the notches of the bridging portions 13 of the metal plates 1 to 4 contact the marginal portions of the notches 11, 12 of other metal plates located beneath the particular metal plate. Accordingly, the metal plates oppose a misalignment force of the metal plates in the direction perpendicular to the notches 11, 12. As a result, a misalignment in the above-mentioned direction of each metal plate 1 to 4 can be reliably controlled.

Incidentally, even if one part of each bridging portion 13 projects to the outer surface of the laminated metal plates due to the bulging, the misalignment preventing portions 10 are located on the cooling water jackets 8, so that there is no interference when the gasket is placed between the cylinder block and a cylinder head.

Also, in the arranging direction of the cylinder bores, the bridging portions 13 bulge in the mountain shape and both hems of the bridging portions 13 have slope faces 14. Accordingly, even if there is a misalignment between the respective metal plates due to lateral displacement of the metal plates 1 to 4, when the joint surfaces are restored, a restoring force along the slope faces of the bridging portions 13 operates. As a result, the metal plates naturally return to the original configuration even if there is a slight misalignment movement.

Moreover, in order to control the development of cracking from the end portions of the notches 11, 12, it is effective that the pairs of notches 11, 12 are bent in a direction such that the both end portions 11b, 12b slope to the arranging or longitudinal direction of the multiple combustion chamber bores 6. In this case, the end portions of the notches 11, 12 can be bent in an arbitrary direction. However, as shown in the drawings, it is preferable that the pair of notches 11, 12 forms a circular arc shape wherein the respective opposed sides of the notches have a depression.

Incidentally, in the drawings, reference numerals 15, 16 represent sealing beads, reference numeral 17 represents water holes in the metal plates 1 to 4, and reference numeral 18 represents bolt holes.

Thus, the laminated multiple metal plates 1 to 4 contact the marginal portions of the notches 11, 12 to each other, so that the misalignment of the respective metal plates 1 to 4 in the direction perpendicular to the arranging direction of the combustion chamber bores 6 is retained. Also, the misalignment of the respective metal plates 1 to 4 in the arranging direction of the combustion chamber bores 6 is restored due to the function of a restoring force along the slope faces of the both hems of the bridging portions 13, so that the misalignment can be controlled.

Moreover, in the cylinder head gasket with the above-mentioned structure, the misalignment preventing portions 10 control the misalignment between the respective metal plates 1 to 4 without retaining them by fastened portions of the respective metal plates 1 to 4. As a result, even if the cylinder block and the cylinder head are relatively displaced, and a force which moves the laminated multiple metal plates 1 to 4 out of alignment from each other is applied, damage of the fastened portions is prevented.

Therefore, not only the fastening process of the respective metal plates can be eliminated, but the misalignment preventing portions 10 can be easily formed. Accordingly, due to the structure of the above-mentioned misalignment preventing portions, the misalignment of the metal plates can be prevented, so that the misalignment preventing portions can be formed in the stage of a press work of the metal plates, and costs for connecting the metal plates can be avoided.

The disclosure of Japanese Patent Application No. 2007-334024, filed on Dec. 26, 2007, is incorporated in the application.

While the invention has been explained with reference to the specific embodiments of the invention, the explanation is illustrative and the invention is limited only by the appended claims.

What is claimed is:

1. A metal laminate cylinder head gasket, comprising:
   a plurality of metal plates laminated together and having cylinder bores arranged in a longitudinal direction of the gasket, and
   a misalignment preventing portion for preventing misalignment of the laminated metal plates, formed in the metal plates, said misalignment preventing portion comprising:
   a pair of notches provided in each of the metal plates, said pair of notches facing each other and penetrating each of the metal plates, and
   a bridging portion provided between the notches in each of the metal plates and bulging in one direction to project from a surface of each of the metal plates, said metal plates being laminated together such that the notches and the bridging portions overlap and closely contact to engage together to thereby prevent displacement of the metal plates,
   wherein the pair of notches is formed on one side of the longitudinal direction of the cylinder bores such that the bridging portion extends in the longitudinal direction, and
   wherein the pair of notches is curved outwardly to form a cylindrical arc shape having a width at a middle of the bridging portion greater than a width at two ends of the bridging portion to control development of cracking from ends of the notches.

2. A metal laminate cylinder head gasket according to claim 1, wherein said notches of the metal plates are arranged such that when the metal plates are assembled, one bridging portion of one metal plate enters a portion between the notches of another metal plate located beneath the one metal plate to engage therewith to thereby prevent misalignment of the one and another metal plates in a direction perpendicular to the longitudinal direction of the gasket.

3. A metal laminate cylinder head gasket according to claim 2, wherein each of the bridging portions has sloping portions at two ends extending in the longitudinal direction of the gasket to allow movement of the metal plates laminated together in the longitudinal direction of the gasket.

4. A metal laminate cylinder head gasket according to claim 3, wherein the bridging portion is depressed between the notches.

5. A metal laminate cylinder head gasket according to claim 4, wherein each of said bridging portion has a trapezoidal shape, and has a height equal to or greater than a thickness of the metal plates laminated together.

6. A metal laminate cylinder head gasket according to claim 1, wherein the misalignment preventing portion is formed on each side of the cylinder bore along the longitudinal direction.

7. A combination comprising the metal laminate cylinder head gasket according to claim 1, and an engine having a cylinder block with a cooling water jacket, wherein said misalignment preventing portion is located in the cooling water jacket of the cylinder block.

* * * * *